US010216180B2

(12) United States Patent
Mere et al.

(10) Patent No.: US 10,216,180 B2
(45) Date of Patent: Feb. 26, 2019

(54) FLIGHT MANAGEMENT SYSTEM OF AN AIRCRAFT

(71) Applicant: AIRBUS OPERATIONS (SAS), Toulouse (FR)

(72) Inventors: Jean-Claude Mere, Verfeil (FR); Pierre Neri, Tournfeuille (FR); Julien Bernat, Toulouse (FR); Marc Vie, Labarthe sur Leze (FR)

(73) Assignee: Airbus Operations (S.A.S.), Toulouse (FR)

( * ) Notice: Subject to any disclaimer, the term of this patent is extended or adjusted under 35 U.S.C. 154(b) by 60 days.

(21) Appl. No.: 15/422,002

(22) Filed: Feb. 1, 2017

(65) Prior Publication Data
US 2017/0147008 A1    May 25, 2017

Related U.S. Application Data

(63) Continuation of application No. 14/552,822, filed on Nov. 25, 2014, now Pat. No. 9,606,534.

(30) Foreign Application Priority Data

Nov. 26, 2013  (FR) ...................... 13 61660

(51) Int. Cl.
*G05D 1/10* (2006.01)
*G08G 5/00* (2006.01)
(Continued)

(52) U.S. Cl.
CPC ............... *G05D 1/00* (2013.01); *G01C 21/00* (2013.01); *G01C 23/00* (2013.01); *G05D 1/0202* (2013.01);
(Continued)

(58) Field of Classification Search
CPC ........ G05D 1/101; G05D 1/00; G05D 1/0202; G08G 5/0021; G08G 5/0039;
(Continued)

(56) References Cited

U.S. PATENT DOCUMENTS 7,437,225 B1   10/2008  Rathinam
9,250,630 B2   2/2016   Downey et al.
(Continued)

FOREIGN PATENT DOCUMENTS

FR    2914995      10/2008
FR    2922665      4/2009
FR    2 935 818    3/2010

OTHER PUBLICATIONS

U.S. Appl. No. 14/553,191 (Mere et al.) filed Nov. 25, 2014.
(Continued)

*Primary Examiner* — Nga X Nguyen
(74) *Attorney, Agent, or Firm* — Nixon & Vanderhye P.C.

(57) ABSTRACT

A flight management system architecture with separate core and supplementary modules. In the core module, generic functionalties relative to the flight management of the aircraft are implemented. In the supplementary module, supplementary functions are implemented. The supplementary functionalities include functionalties specific to an entity to which the aircraft belongs such as the specific aircraft model, a family of aircraft, a company, an alliance, and so on. The flight management system also includes a message exchange interface in which enables the core and supplementary modules to exchanges messages with each other. The core and supplementary modules includes corresponding core module and supplementary module interfacing functionaltities that respectively interface with generic and specific man-machine interfaces.

18 Claims, 2 Drawing Sheets

(51) Int. Cl.
- *G05D 1/00* (2006.01)
- *G05D 1/02* (2006.01)
- *G08G 5/06* (2006.01)
- *H04L 12/26* (2006.01)
- *H04L 29/06* (2006.01)
- *H04L 29/08* (2006.01)
- *G01C 21/00* (2006.01)
- *G01C 23/00* (2006.01)
- *G06Q 10/08* (2012.01)
- *G06Q 10/06* (2012.01)

(52) U.S. Cl.
CPC ............ *G05D 1/101* (2013.01); *G06Q 10/06* (2013.01); *G06Q 10/087* (2013.01); *G08G 5/003* (2013.01); *G08G 5/0021* (2013.01); *G08G 5/0034* (2013.01); *G08G 5/0039* (2013.01); *G08G 5/06* (2013.01); *H04L 43/0823* (2013.01); *H04L 63/08* (2013.01); *H04L 67/12* (2013.01)

(58) Field of Classification Search
CPC ........ G08G 5/0034; G08G 5/06; G08G 5/003; H04L 67/12; H04L 43/0823; H04L 63/08; G06Q 10/06; G06Q 10/087; G01C 23/00; G01C 21/00
See application file for complete search history.

(56) References Cited

U.S. PATENT DOCUMENTS

| | | | |
|---|---|---|---|
| 9,323,248 | B2 | 4/2016 | Mere et al. |
| 2003/0093187 | A1 | 5/2003 | Walker |
| 2004/0162648 | A1 | 8/2004 | Bontrager et al. |
| 2005/0156777 | A1 | 7/2005 | King et al. |
| 2007/0032921 | A1 | 2/2007 | Allen |
| 2008/0154440 | A1 | 6/2008 | Carlton |
| 2008/0163093 | A1 | 7/2008 | Lorido |
| 2008/0215192 | A1* | 9/2008 | Hardman ............... G01C 23/00 701/3 |
| 2009/0132106 | A1 | 5/2009 | Dejonge |
| 2009/0132107 | A1 | 5/2009 | Dejonge |
| 2009/0138097 | A1 | 5/2009 | Rinaldi |
| 2010/0145605 | A1 | 6/2010 | Valex et al. |
| 2011/0137495 | A1 | 6/2011 | Sacle et al. |
| 2012/0078450 | A1 | 3/2012 | Marche et al. |
| 2012/0191273 | A1 | 7/2012 | Jacobs et al. |
| 2012/0265372 | A1 | 10/2012 | Hedrick |
| 2012/0310450 | A1 | 12/2012 | Srivastav et al. |
| 2013/0274962 | A1* | 10/2013 | Cornell ................. B64D 43/00 701/3 |
| 2014/0172204 | A1 | 6/2014 | Coulmeau et al. |
| 2014/0183300 | A1 | 7/2014 | MacCulloch et al. |
| 2014/0257598 | A1 | 9/2014 | Bailey et al. |
| 2014/0309821 | A1 | 10/2014 | Poux et al. |
| 2014/0343760 | A1 | 11/2014 | Le Gall et al. |
| 2015/0148998 | A1 | 5/2015 | Mere et al. |
| 2015/0148999 | A1 | 5/2015 | Mere et al. |
| 2015/0150095 | A1 | 5/2015 | Mere et al. |

OTHER PUBLICATIONS

U.S. Appl. No. 14/553,274 (Mere et al.) filed Nov. 25, 2014.
Search Report for FR 1453296, dated Sep. 26, 2014, 2 pages.
Search Report for FR 1455559, completed Oct. 16, 2014, 8 pages.
Search Report for FR 1361660, dated Aug. 6, 2014, 2 pages.
U.S. Appl. No. 14/553,345 (Mere et al.) filed Nov. 25, 2014.
David Gascon, "Security in 802.15.4 and ZigBee Networks," Apr. 28, 2009, pp. 1-5, XP002728592, http://www.libelium.com/security-802-15-4-zigbee/.

* cited by examiner

FLIGHT MANAGEMENT SYSTEM OF AN AIRCRAFT

CROSS RELATED APPLICATIONS

This application is a continuation of U.S. patent application Ser. No. 14/552,822, filed Nov. 25, 2014, and claims priority to French Application No. 1361660 filed Nov. 26, 2013, both of which are incorporated by reference in its entirety.

TECHNICAL FIELD

The technical area of the present disclosure relates to a flight management system of an aircraft.

BACKGROUND

Avionic systems, in general, and flight management systems in particular, are relatively complex systems whose requirements for new functionalities, notably at the level of conducting the flight of the aircraft, are growing ceaselessly. Thus, the flight management systems that are already installed in aircraft, whose service life is relatively long, must be able to evolve in order to integrate the new functionalities of the moment related to these requirements. Unfortunately, due to the complexity of these systems, necessitates, even for a minor modification, a considerable effort for, on the one hand, their implementation in a system not necessarily adapted for these new functionalities and, on the other hand, for the verification of a correct implementation without associated regression. The result is that at present, any update of flight management systems requires a lot of time and is relatively costly.

SUMMARY

An aspect of the present invention is directed to a flight management system of an aircraft to address one or more short comings of conventional systems and methods to update flight management systems. The proposed architecture makes it possible to develop different functionalities and make them evolve independently, which in turn can ease integration of specific functionalities into the flight management system. For example, functionalities specific to an entity to which the aircraft belongs may be easily integrated. Such an architecture therefore allows a simplified updating of the avionic system, which contributes to reducing the time taken by and the overall cost of such an operation.

A flight management system, which can be on board an aircraft, according to an aspect of the present invention may comprise a core module, a supplementary module, and an exchange interface. The core module may be configured to implement one or more core functionalities related to a flight management of the aircraft, the supplementary module may be configured to implement one or more supplementary functionalities, and the exchange interface may be configured to enable exchange of messages between the core module and the supplementary module.

The core module may be provided with a core interface configured to interface with an on-board system the aircraft. The on-board system may comprise at least one generic man-machine interface. The supplementary module can be provided with a supplementary interface configured to interface with a specific man-machine interface connected to the supplementary module. The supplementary module may be separate from the core module.

One advantage of separating the core and the supplemental modules results from the fact that the supplementary functionalities of the supplementary module can be integrated with the avionic system without the need to modify the elements of the core module. Thus, these supplementary functionalities of the supplementary module can be developed independently from the core module.

DESCRIPTION OF THE DRAWINGS

The foregoing and other objects, features and advantage of the disclosed subject matter will be apparent from the following more particular description of examples of one or more non-limiting embodiments, the description being given with reference to the appended drawings in which.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium—transitory and/or non-transitory—and executed by a computer or processor, whether or not such computer or processor is explicitly shown.

The present description is given in relation to a flight management system of an aircraft, for example, an on-board flight management system. However, it will be understood that the principles explained can be applied to any avionic system, for example an airport navigation system.

Figure 1:
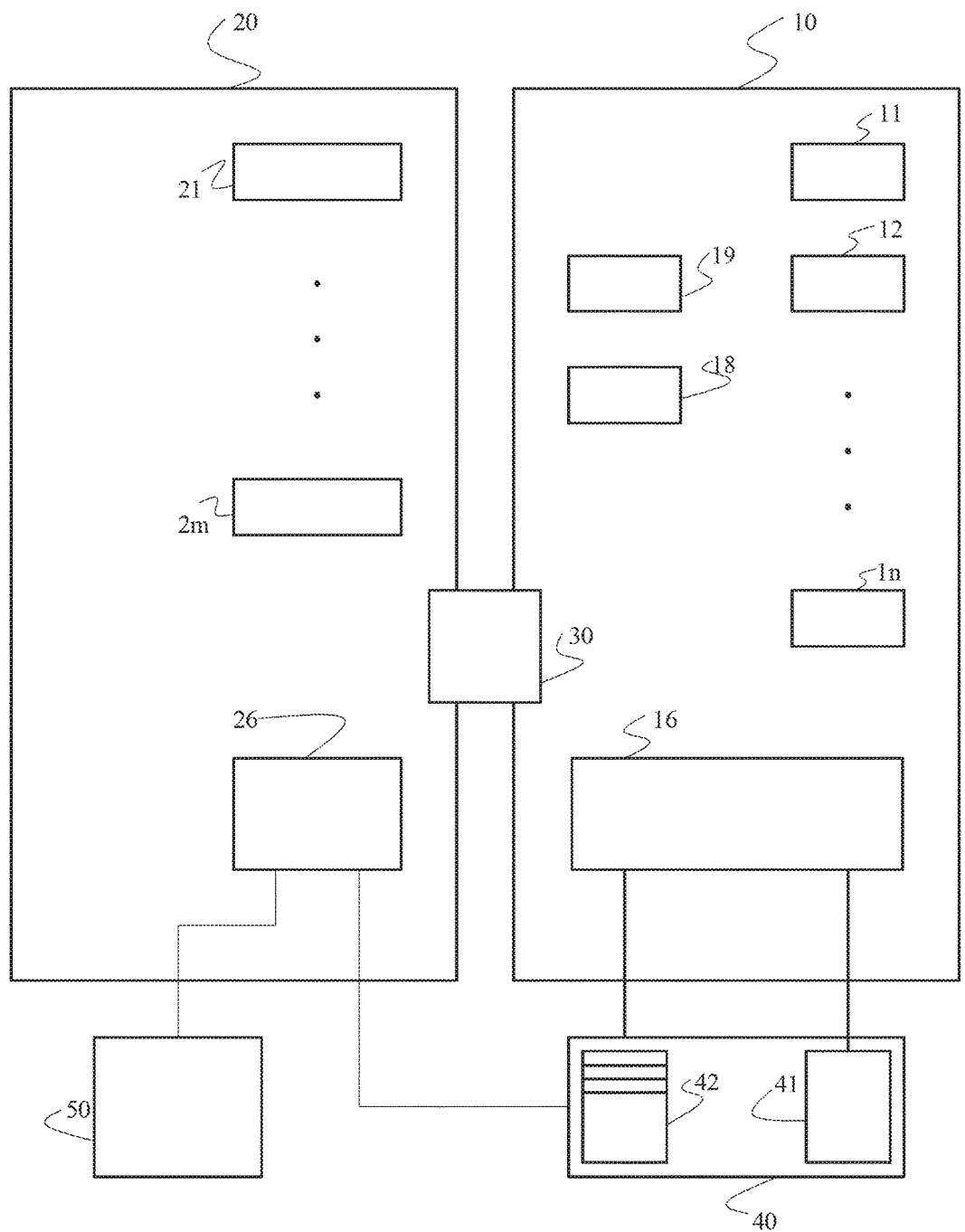
FIG. 1 is a block diagram of a flight management system of an aircraft according to an aspect of the present invention.

An example flight management system shown in FIG. 1, includes, among others, a core module 10 and a supplementary module 20. The core module 10 may comprise core elements configured to implement a set of core functionalities 11 . . . 1n, including functionalities related to a management of a flight of the aircraft (e.g., flight plan management, fuel management, etc.). In one embodiment, each core functionality 11 . . . 1n may be implemented through a corresponding core element. It may then be said that the core module 10 comprises a set of core elements 11 ... 1n. These core functionalities may be either generic basic functions of a flight management system, or functional services, also generic, of the flight management system. These core functional services may use one or more generic functions timed by an operating system (not shown).

The supplementary module 20 may comprise supplementary elements configured to implement a set of supplementary functionalities 21 ... 2m including functionalities specific to an entity to which the aircraft belongs, such as a specific aircraft model, a family of aircraft, a company, an alliance, all or part of a fleet, and so on. In one embodiment, each supplementary functionality 21 ... 2m may be implemented through a corresponding supplementary element. It may then be said that the supplementary module 20 comprises a set of supplementary elements 21 ... 2m. These supplementary functionalities may be new functions with respect to the core functions of the core module 10 (i.e., functions not provided through the cord module 10), or alternative functions to the core functions of the core module 10 to which they provide behavioral modifications, or provide supplementary services so as to supplement the core services of the core module 10 which use one of more of these supplementary functionalities.

Below, the following standard specifications may be mentioned: ARINC653 (Avionics Application Standard Software Interface), IMA (Integrated Modular Avionics (part of ARINC653), AFDX (Avionics Full Duplex Switched Ethernet), ARINC429 (Digital Information Transfer System), and ARINC661 (Cockpit Display System). The contents are incorporated by reference in their entirety.

According to an embodiment, the respective functionalities (11 to 1n; 21 to 2m) of the core module 10 and of the supplementary module 20 may be implemented in at least one partition (in conformity with the ARINC653 standard). In this context, a partition includes software that can be executed in a defined timeslot, segregated from execution timeslots of other partitions (temporal segregation) so that activities in one partition do not affect timing of activities of another partition. The partitions can also be spatially segregated from each other (generally a memory space or input/output space) so as to prevent a partition from accessing a memory space of another partition. These different segregations may be provided by low level logic layers. For example, an operating system may use hardware clocks inside a microprocessor running the partition to provide the temporal segregation. To provide the spatial segregation, the operating system may use mechanisms for controlling access to the physical space (the memory or the input/output space) in question.

Still in this ARINC653 context, each partition can be associated with at least one memory sharing communications port, called RAM ports, allowing that partition to exchange messages with the other partitions. This exchange of messages, also referred to as interpartition communication, can be carried out by sampling (Sampling port: the memory associated with the port is updated on each reception of an item of data) or by queuing (Queuing port: the received messages are placed in a queue). These messages, which can be sent and/or received by a port, may include one or more of the following: specific data requests, requests for the execution of functions or of services, event warnings, transfers of specific messages, transfers of files, etc.

The flight management system shown in FIG. 1 may also comprise a message exchange interface 30 provided between the core module 10 and the supplementary module 20. The exchange interface 30 may comprise at least one core side port allocated for the core module 10 and at least one supplementary side port allocated for the supplementary module 20, respectively, through which the interpartition messages between the supplementary and core modules 10, 20 (e.g., between any core functionality 11 ... 1n and any supplementary functionality 21 ... 2m) may pass. One or both of these ports may be the RAM ports. It is seen that the exchange interface 30 can be implemented in hardware or a combination of hardware and software. Advantageously, the exchange interface 30 may implement an encoding protocol to encode the data carried by the messages passing though it.

The core module 10 may include a core interface 16 configured to interface with an on-board system 40 to thereby allow the core module 10 to communicate with the on-board system 40 of the aircraft. The on-board system 40 may comprise at least one generic man-machine interface 41 and/or one or more on-board devices 42 such as those currently installed in aircraft, like flight instruments, various sensors, etc. Thus, through the core interface 16, any or all core functionalities 11 ... 1n may communicate with the generic man-machine interface 41 and/or with any or all on-board device(s) 42. In an embodiment, the core interface 16 may be provided as a core interfacing application which, when executed, implements a core interfacing functionality that allows the core module 10 to interface with the on-board system 40.

The supplementary module 20 may also include a supplementary interface 26 configured to interface with the exchange interface 30 to thereby allow the supplementary module 20 to communicate with the core module 10. Thus, through the supplementary interface 26, any or all supplementary functionalities 21 ... 2m may communicate, via the exchange interface 30, with any or all core functionalities 11 ... 1n. Note that through the exchange interface 30 and the core interface 16, the supplementary interface 26 can also allow the supplementary functionalities 21 ... 2m to communicate with the generic man-machine interface 41. Alternatively or in addition thereto, the supplementary interface 26 may be configured to interface with the on-board system 40. In this way, the supplementary interface 26 can allow the supplementary functionalities 21 ... 2m to communicate directly with the on-board system 40 (with the generic man-machine interface 41 and/or the on-board device(s) 42).

The supplementary interface 26 may further be configured to interface with a specific man-machine interface 50 specific to the supplementary module 20. The generic and/or the specific man-machine interface 41; 50 may each comprise any combination of widescreens, touch screens, etc., by keyboards, mice, trackballs, head-up display systems, augmented reality systems, etc. In an embodiment, the supplementary interface 26 may provided as a supplementary interfacing application which, when executed, implements a supplemental interfacing functionality that allows the supplementary module 20 to interface with the exchange interface 30 and/or with the on-board system 40.

In a particular non-limiting embodiment, a flight management system may be hosted on several IMA equipments in which the core module 10 and the supplementary module 20 are implemented as separate hardware equipments. Moreover, each module 10; 20 can include one or more on-board hardware equipments. A hardware equipment may comprise for example an arithmetic unit, memory, physical interfaces with various devices of the aircraft as well as an operating system configured to manage a set of partitions in such a way that the equipment in question can implement a function or a service.

In an embodiment, the core 10 and supplementary 20 modules may communicate with each other through an AFDX (Avionics Full Duplex Switched Ethernet) network, by an Ethernet network, by an ARINC429 (Digital Information Transfer System) network, etc. Moreover, one or both of the core and supplementary interfaces 16 and 26 may conform to the ARINC661 (Cockpit Display System) standard which defines the display system of the cockpit of the aircraft and the communications between this system and the applications (functions, services) which manage the avionic functionalities.

In another embodiment, the core 10 and supplementary 20 modules may both be hosted on a single IMA equipment (ARINC653) as a single hardware equipment as separate partitions and whose respective partitions communicate with each other through the RAM ports of the message exchange interface 30 by file sharing (Shared Files) and/or memory sharing (Shared Memories). In this embodiment, the core and/or the supplementary interfaces 16 and 26 may also be in conformity with the ARINC661 standard.

It is thus seen that each of the partitions (core functionalities 11 to 1n, core interface 16) of the core module 10 can be implemented in hardware or in a combination of software and hardware. Accordingly, the core module 10 itself can be implemented in hardware or in a combination of software and hardware. Similarly, each of the partitions (supplementary functionalities 21 to 2m, supplementary interface 26) of the supplementary module 20, and therefore the supplementary module 20 itself, may be implemented in hardware or in a combination of software and hardware. It is further seen that any or all of the exchange interface 30, the generic man-machine interface 41, the specific man-machine interface 50, and the onboard devices 42 may be implemented in hardware or in a combination of software and hardware.

One advantage of a structure with two separate modules results from the fact that the supplementary elements/functionalities 21 . . . 2m of the supplementary module 20 can be integrated in the flight management system without modifying the elements of the core module 10 and because of this use only the functions and functional services of the latter that it offers (in this case the core functionalities of a flight management system). Moreover, these supplementary functionalities can be developed independently of the core module 10.

The generic functionalities 11 to 1n implemented by the core module 10 may include one or more of the following: a flight plan management element configured to implement a flight plan management function, a trajectory calculation element configured to implement a function of calculating a trajectory in space, a prediction element configured to implement a function of calculating predictions of the values taken along a given trajectory of the aircraft by physical quantities relative to the flight conditions (speed, time, quantity of fuel, etc.), an extrapolation element configured to implement a function of extrapolation of values taken along a given trajectory of the aircraft by physical quantities related to the meteorological conditions (wind, temperature, etc.) based on a given model, a position calculation element configured to implement a function of calculating the current position of the aircraft, a deviation calculation element configured to implement a function of calculating deviations between the current position of the aircraft and a position of a given theoretical trajectory, a guidance element configured to implement a functionality of calculating guidance instructions for slaving the aircraft on a given trajectory, and one or more cockpit management entities configured to implement a set of functions making it possible to manage the cockpit of the aircraft according to a split type philosophy (through synchronization and control between several instances of the functions within the cockpit), etc.

Each of the core 10 or supplementary 20 modules can also implement functionalities, called envelope functionalities, other than those that have been described previously.

The core interface 16 of the core module 10 may be configured to acquire aircraft data from various on-board devices 42 (flight instruments, various sensors, etc.). The core interface 16 may advantageously include a core filter (not shown) configured to detect and exclude any invalid data. A filtering algorithm or application may be provided as a part of the core interfacing functionality. The core interface 16 may also include a core consolidator (not shown) configured to mix the set of valid data together into a consolidated item of data. A consolidating algorithm or application may be provided as a part of the core interfacing functionality. In order to access this item of data, a supplementary functionality (e.g., implemented in one or more of the supplementary elements 21 . . . 2m) may send a request on a port for access to a data acquisition aspect of the core interface 16 (the request then passing through the message exchange interface 30). The core interface 16 in return may send a response containing the item of data. This is one (of which there could be several) mechanism of responding to a request addressed to the core interface 16.

The supplementary module 20 can also comprise such a functionality, which is not shown in FIG. 1. In other words, the supplementary interface 26 may include a supplementary filter and supplementary consolidator (e.g., as algorithm(s) or application(s) to the supplementary interfacing functionality). Access to the data items from any of the core functionalities may be accomplished through request and response messages passing through the ports of the message exchange interface 30.

The core module 10 and/or the supplementary module 20 can also comprise a ground data acquiring element configured to implement a functionality (not shown) of acquiring data transmitted from the ground for the aircraft. Such transmissions can take place via an ATN (Aeronautical Telecommunications Network) network, an ACARS (Aircraft Communication Addressing and Reporting System) network, a specific VHF (Very High Frequency) network or a fast point to point wireless link. These data are also accessible by a mechanism of response to a request addressed to the functionality in question.

The core module 10 can also comprise at least one on-board database 18 in which are stored, for example, data created by the crew, or data provided and loaded on the ground (like runways, navaids, waypoints, etc.). While not specifically shown, the core module 10 may also comprise one or more core elements configured to implement functionalities for the management of these databases. Here again, these data may be accessible in read/write by a mechanism of response to a request addressed to the management functionality in question.

The core databases 18 of the core module 10 can be accessed by the core module 10 itself, i.e., by any or all core functionalities 11 . . . 1n and/or the core interface 16. The core databases 18 may also be accessed by the supplementary module 20, indirectly via the exchange interface 30 and the core module 10. That is, any or all supplementary functionalities 21 . . . 2m and/or the supplementary interface 26 may access the core databases 18 via the exchange interface 30. In this latter case, requests and responses may be transmitted via the exchange interface 30 which, as mentioned above, can comprise an encryptor, which ensures the security of these requests and responses.

The supplementary module 20 can also comprise one or more specific supplementary databases (not shown in FIG. 1). Also while not shown, the supplementary module 20 may comprise one or more supplementary elements configured to implement supplementary functionalities to manage these supplementary databases. The supplementary databases may be accessed by the supplementary module 20 (supplementary functionalities 21 . . . 2m, supplementary interface 26) and/or indirectly accessed by the core module 10 (core functionalities 11 . . . 1n, core interface 16) via the exchange interface 30.

The core module 10 can also comprise a core maintenance element 19 configured to implement a core maintenance functionality. This core maintenance functionality can enable, when a failure has been detected on an equipment, the core module 10 to send messages informing a maintenance center of the aircraft of this failure. The core maintenance functionality can also enable the core module 10 to respond to requests from the maintenance center to carry out interactive tests, etc.

The supplementary module 20 can also comprise a supplementary maintenance element (not shown) configured to implement a supplementary maintenance functionality. For example, the supplementary maintenance element may be configured to send messages and respond to requests.

Figure 2:
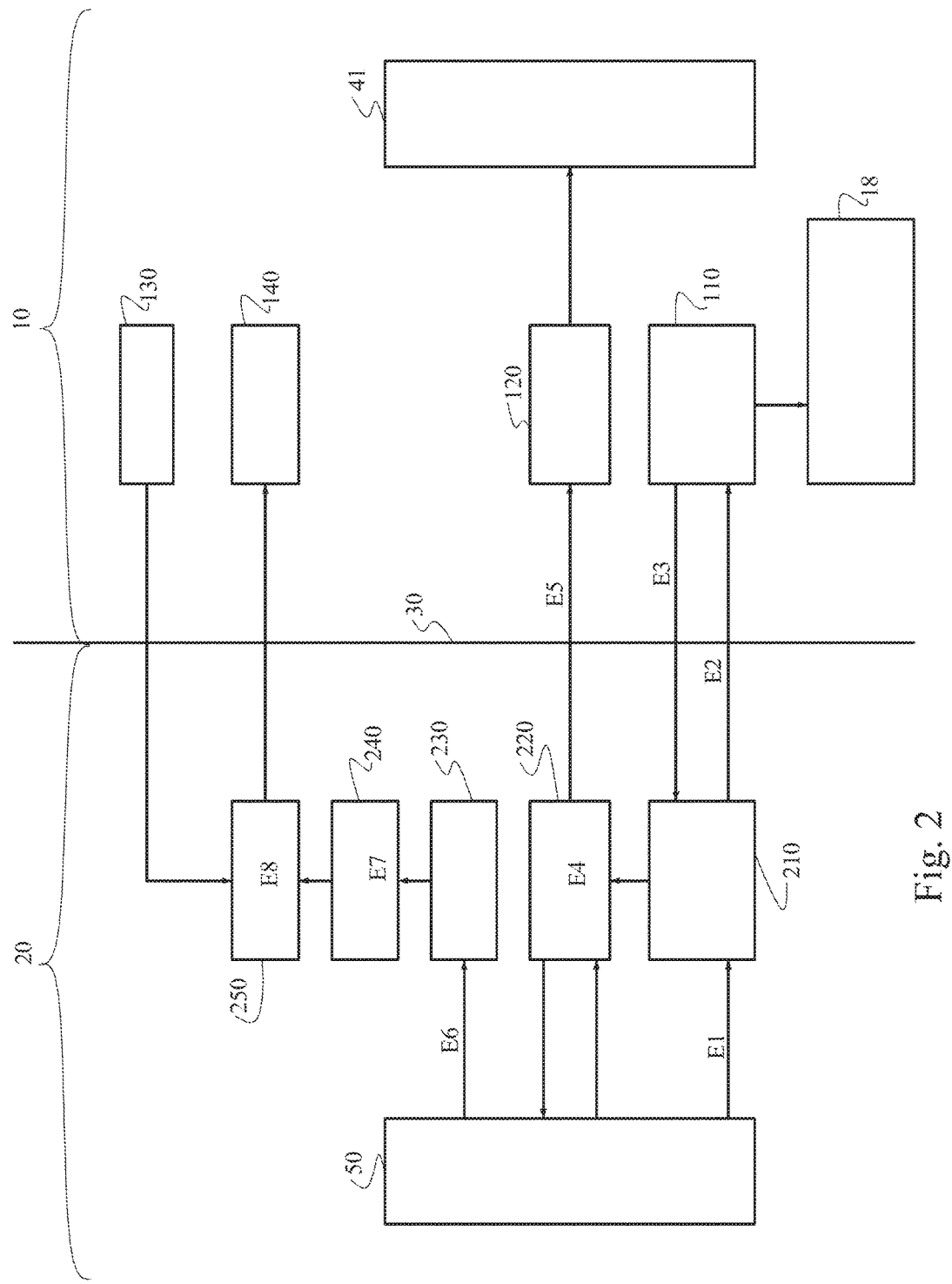
FIG. 2 is a diagram illustrating an implementation of a flight management system of an aircraft according to an aspect of the present invention.

In the rest of the description there will be given, with reference to FIG. 2, an example implementation of a set of supplementary functionalities of a supplementary module (such as the supplementary module 20) in order to make it possible for the crew to perform the following:

- to search for aerodromes (e.g., airports) closest to a current position of the aircraft;
- to display them whilst classifying them according to criteria (the crew may choose the criteria); and then
- to propose an alternative flight plan leading to one of the selected aerodromes and able to be activated in place of a current flight plan.

In order to do this, the core module 10 may be configured to implement the following core functionalities and/or functional services:

- an aerodrome identification functionality 110 to identify one or more aerodromes (e.g., airports) closest to the current position of the aircraft (in an embodiment, this information may be determined from information stored in the database 18, referred to as the navigation database);
- a display functionality 120 to display this information on the generic man-machine interface 41;
- a flight plan transmission functionality 130 to transmit flight plan availability data; and
- a flight plan insertion functionality 140 to insert a new flight plan.

With regard to the supplementary module 20, its supplementary interface 26 may be configured to interface with the specific man-machine interface 50 which allows the crew to make requests and to enter parameters for the latter. The supplementary module 20 may be configured implement one or more of the following supplementary functionalities:

- a search control functionality 210 to control the search for the identification of the closest aerodromes;
- a classification functionality 220 to classify according to the criteria chosen by the crew via the specific man-machine interface 50 of the results obtained in response to requests sent;
- an entity selection functionality 230 to select, via the specific man-machine interface 50, an entity, such as an aerodrome to land on;
- a flight plan generation functionality 240 to generate an alternative flight plan to the one already established; and
- a flight plan check functionality 250 to check on the availability of a flight plan.

In this embodiment, the supplementary functionalities of the supplementary module 20 may provide the sequencing of requests to the core functionalities of the core module 10 (via the ports making it possible to access the functionalities).

An example of the steps of exchanges used are described below. In a first step E1, using the specific man-machine interface 50, the crew may select the search control functionality 210 (for example: a functionality of searching for the closest aerodrome) of the supplementary module 20 and enter the values of the parameters necessary for the implementation of this functionality (for example: a search radius around the current position of the aircraft, maximum number of aerodromes, etc.).

In a second step E2, the search control functionality 210 may send a request to the aerodrome identification functionality 110 of the core module 10 so that the latter searches for the aerodromes closest to the current position of the aircraft, e.g., in the navigation database 18. This request may include the parameters previously selected by the crew. According to one embodiment, this request may be a message containing the parameters. The message may be addressed, in a queuing mode (Queuing port), to the RAM (ARINC 653) port of the aerodrome identification functionality 110 of the core module 10.

In a third step E3, the aerodrome identification functionality 110 of the core module 10 may send a response to the search control functionality 210 of the supplementary module 20. According to one embodiment, this response may be addressed, in the queuing mode (Queuing), to the RAM (ARINC 653) port making it possible to access the search control functionality 210 of the supplementary module 20.

In a fourth step E4, the classification functionality 220 of the supplementary module 20 may:

- calculate predictions based on extrapolations of tabulated values for each of the aerodromes identified in the response from the core module 10 (from the aerodrome identification functionality 110),
- carry out a classification of the aerodromes based on the predictions, according to criteria which can be defined by the crew on the specific man-machine interface 50, and
- display the result on the specific man-machine interface 50.

In a fifth step E5, the classification functionality 220 of the supplementary module 20 may send to the display functionality 120 of the core module 10 a request to display the aerodromes in a particular color on the generic man-machine interface 41, for example, on the navigation screen (Navigation Display). As indicated before, this request from the classification functionality 220 to the display functionality 120 may be addressed in queuing mode (Queuing), to the RAM (ARINC 653) port making it possible to access the display functionality 120 of the core module 10.

In a sixth step E6, through the entity selection functionality 230 and the specific man-machine interface 50, the crew, e.g., the pilot of the aircraft may select an aerodrome from among the aerodromes displayed on the navigation screen.

In a seventh step E7, the flight plan generation functionality 240 of the supplementary module 20 may calculate or generate an alternative flight plan leading directly to the aerodrome that has been selected.

In an eighth step E8, the flight plan check functionality 250 may read the data concerning the existence and the availability of a secondary (and therefore not occupied) flight plan that the flight transmission functionality 130 of the core module 10 sends periodically via messages on a port, in sampling mode (Sampling port). If, on reading these data, it happens that no secondary flight plan is available, the flight plan check functionality 250 may command, via the exchange interface 30 and the display functionality 120, the display on the generic man-machine interface 41 a message to warn the crew. If, on the other hand, it happens that a secondary flight plan is available (as is the case in FIG. 2), then the flight plan check functionality 250 may address to the flight plan insertion functionality 140 of the core module 10 a request for insertion of the alternative flight plan in the available secondary flight plan. This request can for example be conveyed by a message on a RAM (ARINC 653) port in "queuing" mode (Queuing).

At this time, the core module 10 has access to the secondary flight plan that can be consulted by the crew, via its generic man-machine interface 41, and can possibly be activated for guidance.

The advantages (not necessarily exhaustive) that result from one or more aspects of the invention are as follows. It allows development independently of the generic functionalities of the core module and of the supplementary functionalities of the supplementary module. Since the supplementary functionalities have the sole integration constraint of being compatible with the generic functionalities offered by the core module, the aspect(s) of the invention makes it possible to make the flight management system evolve solely via modification of the supplementary module. Functionalities specific to an entity, such as an aircraft, a family of aircraft, a company, an alliance, all or part of a fleet, can thus be implemented in the flight management system without necessitating in-depth modifications of the entire system.

Moreover, it makes it possible to integrate supplementary functionalities in a flight management system that has become complex without strictly stacking these developments in voluminous software that is difficult to maintain. Moreover, it makes it possible to prepare the vision of avionic architectures of the future with, on the one hand, a flight management system that is confined to the management of the trajectory for the guidance and, on the other hand, other systems which support mission management and decision making assistance.

Finally, it allows an increased maturity of the core module thanks to its wider deployment and its greater stability. Thus, the frequency of evolution of the core module is reduced, which makes it possible to reduce anomalies (regressions, introduction of new functionalities which exhibit faults, etc.).

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

The invention claimed is:

1. A flight management system of an aircraft, comprising:
   a core module configured to implement one or more core functionalities related to a flight management of the aircraft, wherein the core module is implemented in a core partition;
   a supplementary module configured to implement one or more supplementary functionalities, wherein the supplementary module is distinct from the core module and the supplementary module is implemented in a supplementary partition; and
   an exchange interface configured to exchange messages between the core module and the supplementary module,
   wherein the core module comprises a core interface configured to interface with an on-board system of the aircraft including a first generic man-machine interface,
   wherein the supplementary module comprises a supplementary interface configured to interface with a second man-machine interface connected to the supplementary module
   wherein the core partition and the supplementary partition are at least one of:
   (a) temporally segregated such that activities of one of the core partition and the supplementary partition do not affect timings of activities of the other of the core partition and the supplementary partition, and
   (b) spatially segregated such that one of the core partition and the supplementary partition is prevented from accessing a memory space of the other of the core partition and the supplementary partition.

2. The flight management system as claimed in claim 1, wherein the supplementary functionalities are specific to an entity to which the aircraft belongs.

3. The flight management system as claimed in claim 1, wherein the supplementary interface is configured to enable the supplementary module to access the on-board systems of the aircraft, either directly or indirectly via the core interface.

4. The flight management system as claimed in claim 1, wherein each core functionality of the core module and/or each supplementary functionality of the supplementary module is implemented in at least one of the core partition and the supplementary partition, and
   wherein the core and the supplementary functionalities communicate with each other via the exchange interface.

5. The flight management system as claimed in claim 4, wherein the core and the supplementary functionalities communicate with each other by a mechanism of response to requests respectively addressed to the functionalities.

6. The flight management system as claimed in claim 4, wherein the core module and the supplementary module are implemented on a same hardware equipment.

7. The flight management system as claimed in claim 4, wherein the core module and the supplementary module are implemented in separate hardware equipment, and
   wherein the hardware equipment of the core and supplementary modules communicate via a network.

8. The flight management system as claimed in claim 1, wherein the at least one of the following core functionalities includes one or more of:

a flight plan management functionality,
a trajectory calculation functionality to calculate a trajectory in space,
a prediction functionality to predict values taken along a given trajectory of the aircraft by physical quantities related to flight conditions,
an extrapolation functionality to extrapolate values taken along a given trajectory of the aircraft by physical quantities related to meteorological conditions based on a given model,
a position calculation functionality to calculate a current position of the aircraft,
a deviation calculation functionality to calculate deviations between the current position of the aircraft and a position of a given theoretical trajectory,
a guidance functionality to generate guidance instructions to guide the aircraft on a given trajectory,
one or more cockpit management functionalities to enable the cockpit of the aircraft to be managed according to a split type philosophy,
an aerodrome identification functionality to identify the aerodromes closest to the current position of the aircraft,
a flight plan transmission functionality to transmit flight plan availability data, and
a flight plan insertion functionality to insert a new flight plan.

9. The flight management system as claimed in claim 1, wherein the at least one of the following supplementary functionalities includes one or more of:
a search control functionality to control a search to identify closest aerodromes,
a classification functionality to classify, according to criteria chosen by a crew in a request, results obtained in response to the request,
an entity selection functionality to select an entity in response to a request,
a flight plan generation functionality to generate an alternative flight plan to an already established flight plan, and
a flight plan check functionality to check for an availability of a flight plan.

10. The flight management system as claimed in claim 1, wherein the supplementary functionalities are one or more of:
new functions with respect to the core functions of the core module not provided through the cord module,
alternative functions to the core functions of the core module to which the alternative functions provide behavioral modifications, and/or
supplementary services so as to supplement the core services of the core module which use one of more of the supplementary functionalities.

11. A flight management system of an aircraft, comprising, onboard the aircraft:
a core module that implements one or more core functionalities related to a flight management of the aircraft;
a supplementary module that implements one or more supplementary functionalities specific to an entity to which the aircraft belongs; and
an exchange interface connected between the core module and the supplementary module configured to exchange messages between the core module and the supplementary module,
wherein the core module comprises a core interface, which is different from the exchange interface, that interfaces with an on-board system of the aircraft, the on-board system comprising a first man machine interface,
wherein the supplementary module comprises a supplementary interface, which is different from the exchange interface, that interfaces with a second man-machine interface,
wherein the core module is implemented in a core partition and the supplementary module is implemented in a supplementary partition, the core partition and the supplementary partition being separate partitions of a computing system onboard the aircraft,
wherein the core partition and the supplementary partitions are at least one of:
(A) temporally segregated wherein activities of one of the core partition or the supplementary partition do not affect timings of activities of the other partition of the core partition and the supplementary partition, and
(b) spatially segregated wherein one of the core partition and the supplementary partition is prevented from accessing a memory space of the other partition of the core partition and the supplementary partition.

12. The flight management system as claimed in claim 11, wherein the one or more supplementary functionalities are specific to a specific aircraft model, a family of aircraft, a company, an alliance and/or all or part of a fleet of aircraft.

13. The flight management system as claimed in claim 11, wherein the supplementary interface is configured to enable the supplementary module to access the on board systems of the aircraft, either directly or indirectly via the core interface.

14. The flight management system as claimed in claim 11, wherein each of the at least on core functionalities is implemented in the core partition and/or each of the at least one supplementary functionalities is implemented in the supplementary partition.

15. The flight management system as claimed in claim 14, wherein the at least one core functionalities communicates with and the at least one supplementary functionalities by a mechanism of response to requests respectively addressed to the functionalities.

16. The flight management system as claimed in claim 14, wherein the core module and the supplementary module are implemented on a same hardware equipment.

17. The flight management system as claimed in claim 14, wherein the core module and the supplementary module are implemented in separate hardware equipment, and the core module communicates via a network with the supplementary module.

18. A flight management system of an aircraft, comprising:
a core module that implements one or more core functionalities related to a flight management of the aircraft;
a supplementary module that implements one or more supplementary functionalities specific to an entity to which the aircraft belongs; and
an exchange interface that enables messages to be exchanged between the core module and the supplementary module,
the core module comprising a core interface, which is different from the exchange interface, that interfaces with a first man machine interface,
the supplementary module comprising a supplementary interface, which is different from the exchange interface, that interfaces with a second man-machine interface, and the core module configured to implement at least one of the following core functionalities related to the flight management of the aircraft:
- a flight plan management functionality,
- a trajectory calculation functionality to calculate a trajectory in space,
- a prediction functionality to predict values taken along a given trajectory of the aircraft by physical quantities related to flight conditions,
- an extrapolation functionality to extrapolate values taken along a given trajectory of the aircraft by physical quantities related to meteorological conditions based on a given model,
- a position calculation functionality to calculate a current position of the aircraft,
- a deviation calculation functionality to calculate deviations between the current position of the aircraft and a position of a given theoretical trajectory,
- a guidance functionality to generate guidance instructions to guide the aircraft on a given trajectory,
- one or more cockpit management functionalities to enable the cockpit of the aircraft to be managed according to a split type philosophy,
- an aerodrome identification functionality to identify the aerodromes closest to the current position of the aircraft,
- a flight plan transmission functionality to transmit flight plan availability data, and
- a flight plan insertion functionality to insert a new flight plan, wherein the core module is implemented in a core partition and the supplementary module is implemented in a supplementary partition, the core partition and the supplementary partition being separate partitions of a computing system onboard the aircraft, wherein the core partition and the supplementary partition are at least one of:

temporally segregated such that activities of one of the core partition and the supplementary partition do not affect timings of activities of the other of the core partition and the supplementary partition, and spatially segregated such that one of the core partition and the supplementary partition is prevented from accessing a memory space of the other of the core partition and the supplementary partition.

* * * * *